(12) United States Patent
Sethuramalingam et al.

(10) Patent No.: US 11,863,377 B2
(45) Date of Patent: Jan. 2, 2024

(54) DISCOVERY AND CONFIGURATION IN COMPUTER NETWORKS

(71) Applicant: DELL PRODUCTS L.P., Round Rock, TX (US)

(72) Inventors: Karthik Sethuramalingam, Bangalore (IN); Ravishankar N, Bangalore (IN); Naveen Dhanaraju, Bangalore (IN); Vikram Kannambadi Vishwanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 16/777,515

(22) Filed: Jan. 30, 2020

(65) Prior Publication Data

US 2021/0243078 A1    Aug. 5, 2021

(51) Int. Cl.
| | |
|---|---|
| *H04L 41/0806* | (2022.01) |
| *H04L 41/08* | (2022.01) |
| *H04L 41/084* | (2022.01) |
| *G06F 9/4401* | (2018.01) |
| *H04L 45/02* | (2022.01) |
| *G06F 9/445* | (2018.01) |
| *H04L 12/46* | (2006.01) |

(52) U.S. Cl.
CPC ........ *H04L 41/0806* (2013.01); *G06F 9/4406* (2013.01); *G06F 9/44505* (2013.01); *H04L 12/4641* (2013.01); *H04L 41/0843* (2013.01); *H04L 41/0886* (2013.01); *H04L 45/02* (2013.01)

(58) Field of Classification Search
CPC ............. H04L 41/0806; H04L 12/4641; H04L 41/0843; H04L 41/0886; H04L 45/02; G06F 9/4406; G06F 9/44505
USPC ........................................................ 709/220
See application file for complete search history.

(56) References Cited

U.S. PATENT DOCUMENTS

| | | | | |
|---|---|---|---|---|
| 7,380,025 B1 * | 5/2008 | Riggins | ................... | H04L 41/12 710/10 |
| 7,466,996 B2 * | 12/2008 | Carballo | ................. | H04L 12/10 455/343.1 |

(Continued)

OTHER PUBLICATIONS

"Dell EMC Solutions for Microsoft Azure Stack HCI", Dell Inc., 2019, Rev. A05.

*Primary Examiner* — Suraj M Joshi
*Assistant Examiner* — Sherman Lin
(74) *Attorney, Agent, or Firm* — Joseph Mencher (57) ABSTRACT

A network (e.g. cloud or enterprise network) includes servers (110) and switches (120) each of which has multiple ports. A bare-metal server's ports are configured for different roles, e.g. management role or data role. The configuration is at least partially automated using a blueprint (340) which does not necessarily specify the roles for the server ports, but may associate a role with a network parameter, e.g. Maximum Transfer Unit (MTU) or QoS. A management computer (320) obtains, from switches, (i) network parameters configured on switch ports, and (ii) MAC addresses for the adjacent server ports. The management computer matches the blueprint's parameters with the switch ports' parameters, and associates matched parameters with the roles specified by the blueprint. These roles are configured on the corresponding server ports. Other features are also provided.

20 Claims, 5 Drawing Sheets

(56) References Cited

U.S. PATENT DOCUMENTS

| | | | |
|---|---|---|---|
| 8,862,799 B2 | 10/2014 | Rastogi et al. | |
| 8,880,817 B2 | 11/2014 | Krishnan et al. | |
| 9,805,322 B2 | 10/2017 | Kelkar et al. | |
| 10,097,620 B2 | 10/2018 | Reddy et al. | |
| 10,169,100 B2 | 1/2019 | Barzik et al. | |
| 10,419,311 B2 | 9/2019 | Laribi et al. | |
| 10,445,695 B2 | 10/2019 | Chaganti | |
| 10,798,014 B1* | 10/2020 | Krishnamurthy | H04L 47/36 |
| 2004/0255154 A1* | 12/2004 | Kwan | H04L 63/08 726/4 |
| 2006/0168152 A1* | 7/2006 | Soluk | H04L 63/105 709/220 |
| 2006/0274774 A1* | 12/2006 | Srinivasan | H04L 41/0809 370/420 |
| 2011/0093579 A1* | 4/2011 | Koizumi | H04L 41/06 709/223 |
| 2014/0208133 A1 | 7/2014 | Gopal et al. | |
| 2014/0215030 A1 | 7/2014 | Terwilliger et al. | |
| 2014/0376558 A1* | 12/2014 | Rao | H04L 49/351 370/401 |
| 2015/0317169 A1 | 11/2015 | Sinha et al. | |
| 2017/0286164 A1* | 10/2017 | Kinoshita | H04L 41/12 |
| 2019/0020501 A1* | 1/2019 | Yu | H04L 45/02 |
| 2019/0020540 A1 | 1/2019 | Yen et al. | |
| 2020/0106862 A1* | 4/2020 | Chugtu | H04L 67/34 |

\* cited by examiner

DISCOVERY AND CONFIGURATION IN COMPUTER NETWORKS

BACKGROUND

The present disclosure relates to computer networks, and more particularly to network discovery and configuration.

Figure 1:
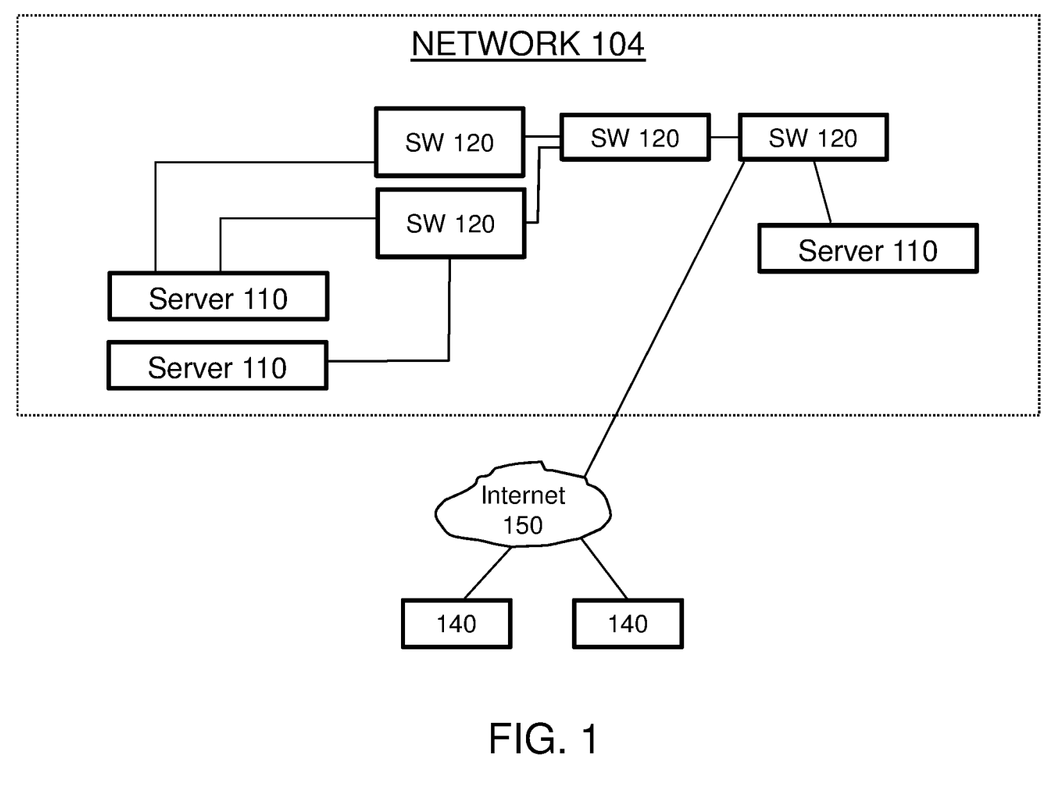
FIG. 1 illustrates a computer network.

A computer network 104 (FIG. 1), e.g. a cloud or enterprise network, may have hundreds or thousands of servers 110 interconnected by switches 120, to provide services to clients within the network 104 and to outside client computers 140 connected to network 104 via the Internet and/or other network(s) 150. Network 104 may have to be frequently reconfigured during operation, in order to recover from network failures or adapt to changing business or technology environment. Reconfiguration may involve adding or removing nodes 110 or 120 or their hardware or software components (disks, network interface cards (NICs), Virtual Machines (VMs), etc.), or moving the hardware or software components from one node to another, or re-allocating the nodes or their components between different clients. Ensuring proper network configuration can be a monumental task for a human administrator. Therefore, even partial automation of network configuration is highly desirable.

SUMMARY

This section summarizes some features of the present disclosure. Other features are described in subsequent sections. The invention is defined by the appended claims.

Some embodiments of the present invention completely or partially automate certain aspects of network configuration, such as configuration of a server's network ports connected to the network. This is particularly helpful if a server 110 has multiple network ports used for different purposes (different roles). For example, a server may be configured to load specific software (e.g. operating system) through a specific port. Also, it may be desirable to use faster ports for data traffic, while slower ports for management traffic. Typically, each port's role is manually configured by a human administrator. However, manual configuration is a labor-intensive, error-prone task. Therefore, some embodiments of the present invention at least partially automate configuring the ports for their roles.

Other features are within the scope of the invention, as defined by the appended claims.

DETAILED DESCRIPTION

This section describes some embodiments in detail. The invention is defined by the appended claims.

Figure 2:
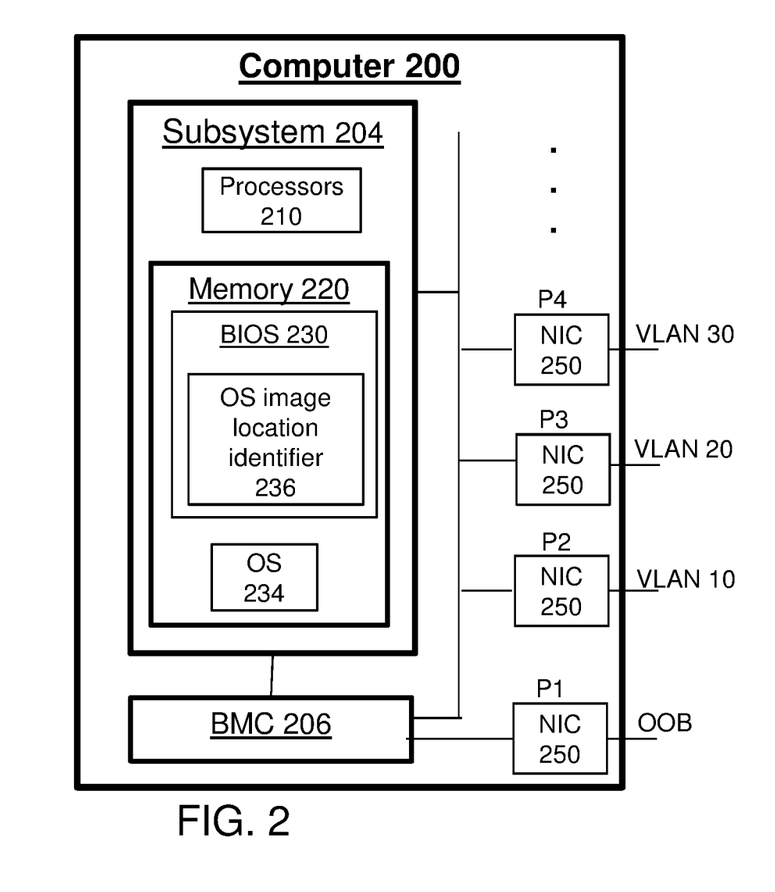
FIG. 2 illustrates an exemplary computer architecture suitable for some embodiments of the present invention.

FIG. 2 shows computer architecture 200 that will be used to illustrate some network configuration aspects of the present invention. Any server 110 or switch 120 may have the architecture of FIG. 2, or may have some other architecture.

Computer 200 includes a subsystem 204 connected to baseboard management controller (BMC) 206. Subsystem 204 includes one or more computer processors 210 executing computer programs stored in memory 220. Memory 220 is also used for data storage. Memory 220 may include volatile and/or non-volatile memories implemented as semiconductor, magnetic, optical, or other technologies.

The computer programs stored in memory 220 include BIOS (Basic Input/Output System) 230, which is a bootstrapping program executed automatically when the subsystem 204 is powered up. In this disclosure, the term "BIOS" is used broadly, to include any bootstrapping technology, for example UEFI (Unified Extensible Firmware Interface).

Memory 220 stores an operating system (OS) 234. In some embodiments, the OS is loaded into memory 220 in response to BIOS instructions. The OS is loaded from a storage location specified by OS image location identifier 236. The OS image storage can be part of computer 200, or can be remote (i.e. accessible over a network).

BMC 206 provides remote access to computer 200 even when the processors 210 are down and/or memory 220 is corrupt. BMC 206 may include its own computer processors and/or memory (not shown), and/or may share processors or memory or other resources with subsystem 204. Exemplary BMC types are Dell Remote Access Manager (DRAC) and integrated DRAC (iDRAC), that are available from Dell Corporation of the Unites States of America. See for example the following documents incorporated herein by reference: US Pre-Grant Patent Application US 2019/0020540 A1, published Jan. 17, 2019 (inventors: Yen et al.); US 2014/0215030 A1, published Jul. 31, 2014 (inventors: Terwilliger et al.); US 2014/0208133 A1, published Jul. 24, 2014 (inventors: Gopal et al.).

Subsystem 204 and BMC 206 are connected to the network via one or more ports P1, P2, . . . each of which is implemented by a Network Interface Card (NIC) 250. A port may include multiple subports, and a subport may include multiple slots, and each slot may provide a separate physical connection to the network. Also, a single NIC 250 may implement multiple ports or subports or slots. For simplicity, the term "port" will be used herein to refer to a port, a subport, a slot, or any other physical interface to the network, unless a different meaning is indicated. Also, for ease of description, we will assume that each NIC 250 corresponds to a single port; but the invention is not so limited.

Different ports may be used for different roles. For example, port P1 may be used for out-of-band (OOB) communications, i.e. communications with BMC 206. Ports P2, P3, P4 may be used for data communications (i.e. client communications and/or non-management communications). In the example of FIG. 2, ports P2, P3, P4 are configured in different VLANS (Virtual Local Area Networks), shown as VLANs 10, 20, 30. Thus, the role of port P2 is limited to the traffic in VLAN 10; the role of port P3 is limited to the traffic in VLAN 20; and the role of port P4 is limited to the traffic in VLAN 30. A role may be defined by one or more limitations to be met simultaneously or in the alternative or according to some other formula.

One or more of ports P2, P3, P4 can also be used for in-band management, e.g. to transmit statistical or other data to a management computer (not shown), or receive configuration data for configuring the computer 200, e.g. to configure VLANs on the ports 250, or configure Virtual Machines (VMs), or to load the OS 234 from an OS image, for other types of configuration. An in-band management role and other roles can be defined in any way meaningful for a particular application of the network.

Figure 3A:
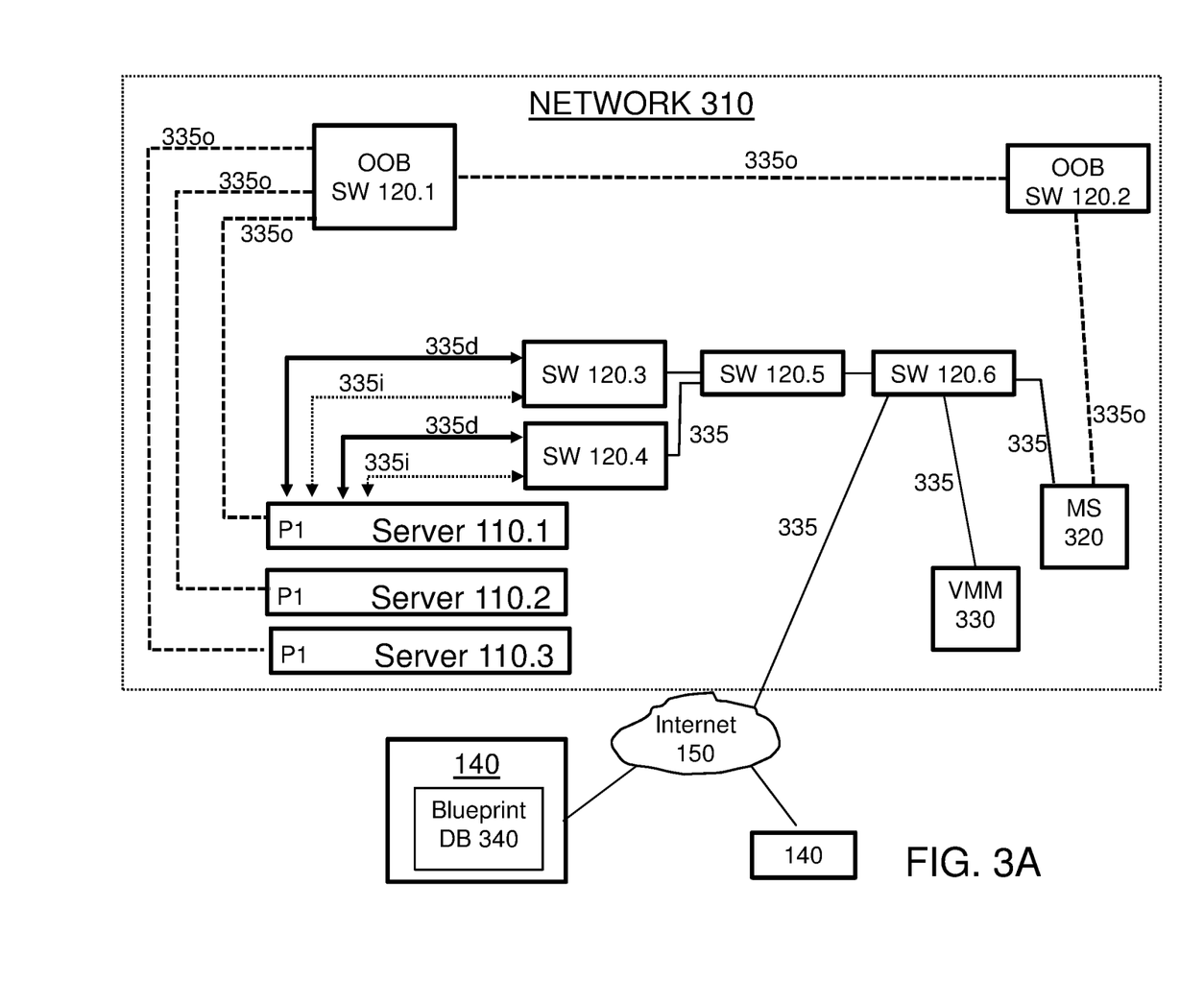
FIG. 3A illustrates an exemplary computer network used in some embodiments of the present invention.

FIG. 3A illustrates an exemplary network 310 that will be used to illustrate some network configuration aspects of some embodiments. Network 310 includes servers 110 (110.1, 110.2, 110.3) and switches 120 (120.1, 120.2, ... ). Network 310 is connected to the Internet and/or other networks 150 for communication with outside computers 140, as in FIG. 1. Servers 110 may be storage units, computational units, or other types.

Network 310 includes a management station ("Management Solution" or MS) 320 and Virtual Machine Manager (VMM) 330. Each of nodes 110, 120, 320, 330 may have some or all of the components of computer system 200 of FIG. 2, and/or other components.

Network links 335 include links 335o (shown by thick dashed lines) carrying OOB traffic; links 335d carrying data traffic; and links 335i (thin dashed lines) carrying in-band management traffic. A link may have multiple uses, e.g. carry both in-band management and data traffic. A link 335 may be a physically link (electric or optical cable for example, or a string of cables). A link 335 may be a virtual link, possibly traversing different networks. The ports interconnected by a virtual link communicate as if they were interconnected by a physical link. For example, if the ports execute a Link Layer Discovery Protocol (LLDP), they treat each other as neighbors.

Switches 120.1 and 120.2 are part of the OOB network, i.e. dedicated to OOB traffic. (A switch may or may not be dedicated to OOB traffic or some other kind of traffic.) Switch 120.1 is immediately (directly) connected to ports P1 of servers 110.1, 110.2, 110.3. As used herein, immediate (direct) connection is a connection by a link 335.

Switches 120.3 through 120.6 are used for in-band management and data traffic. The switches 120.3 and 120.4 are immediately (directly) connected to servers 110. In some embodiments, servers 110 and switches 120.1, 120.3, 120.4 are mounted on a single rack (not shown), and switches 120.3 and 120.4 are "top of the rack" switches (TORs). In some embodiments, one or more servers 110 are configured for Storage Spaces Direct operation; see e.g. "Dell EMC Solutions for Microsoft Azure Stack HCI", Dell Inc., 2019, Rev. A05, incorporated herein by reference. In some embodiments, one or more servers are configured for VSAN operation; see e.g. U.S. Pat. No. 8,862,799, issued Oct. 14, 2014, incorporated herein by reference. These details are exemplary and not limiting.

Figure 3B:
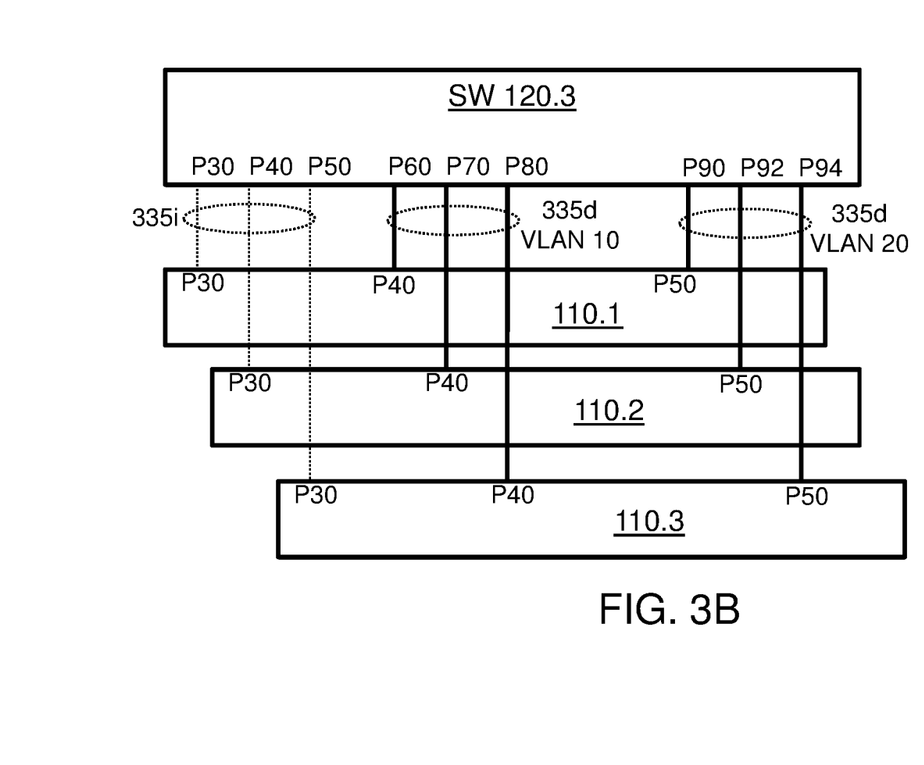
FIG. 3B illustrates exemplary switch-to-server interconnection in some embodiments of the present invention.

FIG. 3B shows exemplary interconnection between switch 120.3 and servers 110. Switch ports P30, P40, P50 are immediately connected to ports P30 of respective servers 110.1, 110.2, 110.3; switch ports P60, P70, P80 are immediately connected to ports P40 of respective servers 110.1, 110.2, 110.3; switch ports P90, P92, P94 are immediately connected to ports P50 of respective servers 110.1, 110.2, 110.3.

In this example, servers 110 will be configured to use their ports P30 for in-band management traffic (and possibly data traffic); ports P40 for data traffic on a VLAN 10; and ports P50 for data traffic on a VLAN 20. Such configuration can be at least partially automated by a process shown in FIG. 4. This process can be performed, for example, to deploy any one or more of servers 110 when they are newly connected ("bare metal" servers) or after a period of inactivity. In some embodiments, this process is performed before the servers execute or even load their respective OS 234 (FIG. 2).

Figure 4:
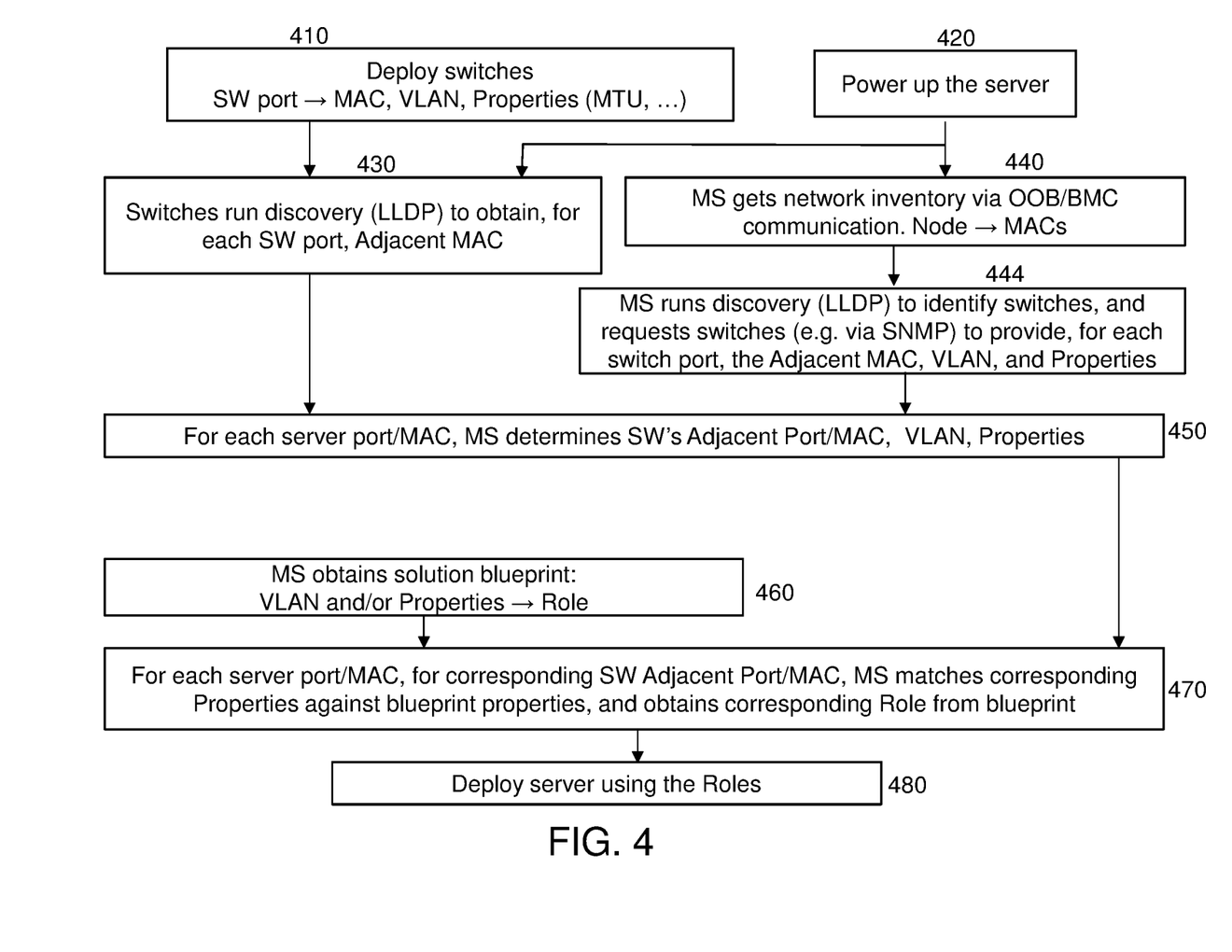
FIG. 4 is a flowchart of network configuration process in some embodiments of the present invention.

The process of FIG. 4 will now be illustrated on the example of server 110.1 of FIG. 3B. At step 410, switches 120 are deployed using any suitable, possibly conventional, techniques. Of note, each port of each switch 120 has a MAC (Media Access Control) address, which is typically a physical address burned into the port's NIC 250 (FIG. 2). Alternatively, the MAC address may be a logical address. In the switch deployment process, each switch port may be associated with a VLAN (e.g. VLAN 10 for switch ports P60, P70, P80 in FIG. 3A). A switch port may also be associated with properties such as maximum frame size (also called maximum transmission unit or MTU), duplex setting (full or half duplex); QoS; whether or not a particular protocol, e.g. Spanning Tree Protocol, is enabled on the port; and/or others. Table 1 below shows an exemplary configuration of ports P30 through P94 of switch 120.3 at the end of deployment process 410:

TABLE 1

Ports of Switch 120.3

| PORT | MAC address | VLAN ID | MTU and other properties |
|---|---|---|---|
| P30 (FastEth1/3) | 00:50:56:9c:5d:4a | None | MTU = 1500; ... |
| P40 (FastEth1/4) | 00:50:56:9c:5d:4b | None | MTU = 1500; ... |
| P50 (FastEth1/5) | 00:50:56:9c:5d:4c | None | MTU = 1500; ... |
| P60 (FastEth1/6) | 00:50:56:9c:5d:4d | 10 | MTU = 9162; ... |
| P70 (FastEth1/7) | 00:50:56:9c:5d:4e | 10 | MTU = 9162; ... |
| P80 (FastEth1/8) | 00:50:56:9c:5d:4f | 10 | MTU = 9162; ... |
| P90 (FastEth1/9) | 00:50:56:9c:5d:5a | 20 | MTU = 9162; ... |
| P92 (FastEth1/10) | 00:50:56:9c:5d:5b | 20 | MTU = 9162; ... |
| P94 (FastEth1/11) | 00:50:56:9c:5d:5c | 20 | MTU = 9162; ... |

In this example, the ports are assigned logical names (such as "FastEth1/3" for port P30) to simplify port management for human administrators. In-band management ports P30, P40, P50 are configured with MTU=1500. The other ports are configured for data traffic with MTU=9162.

At step 420, server 110.1 is powered up.

At step 430, switches 120 execute a discovery protocol, e.g. Link Layer Discovery Protocol (LLDP), possibly over the in-band network (which may include the in-band management links 335i and/or data links 335d and/or other links, and the ports and computers interconnected by such links). The servers' NICs 250 can be pre-configured to respond to discovery protocol messages from the switches even if the servers have not yet been deployed. During discovery, each server's NIC 250 informs the immediately connected switch port of the server NIC's MAC address and possibly other properties, for example MTU etc. Some properties, including the MTUs, may be negotiated between the switch port and the server port in the discovery process, possibly changing the server settings obtained in step 410.

At the end of step 430, switch 120.3 may store, in its memory 220 (FIG. 2), a database such as shown in Table 2 below. Table 2 has the same information as Table 1, plus an additional column, "Adjacent MAC", showing the MAC address for each immediately connected port, which can be a server port, a switch port, or a port of some other device. (Of note, a switch port may be immediately connected to multiple ports of other devices, and the "Adjacent MAC" entry may include multiple MACs.) The Adjacent MACs and possibly other Information in Table 2 may be included in the switch's forwarding tables.

TABLE 2

Database in Switch 120.3 after Step 430

| PORT | MAC address | VLAN ID | MTU and other properties | Adjacent MAC |
|---|---|---|---|---|
| P30 (FastEth1/3) | 00:50:56:9c:5d:4a | None | MTU = 9162 . . . | 00:50:56:9c:6d:4a |
| P40 (FastEth1/4) | 00:50:56:9c:5d:4b | None | MTU = 9162 . . . | 00:50:56:9c:6d:4b |
| P50 (FastEth1/5) | 00:50:56:9c:5d:4c | None | MTU = 9162 . . . | 00:50:56:9c:6d:4c |
| P60 (FastEth1/6) | 00:50:56:9c:5d:4d | 10 | MTU = 9162 . . . | 00:50:56:9c:6d:4d |
| P70 (FastEth1/7) | 00:50:56:9c:5d:4e | 10 | MTU = 9162 . . . | 00:50:56:9c:6d:4e |
| P80 (FastEth1/8) | 00:50:56:9c:5d:4f | 10 | MTU = 9162 . . . | 00:50:56:9c:6d:4f |
| P90 (FastEth1/9) | 00:50:56:9c:5d:5a | 20 | MTU = 1500 . . . | 00:50:56:9c:6d:5a |
| P92 (FastEth1/10) | 00:50:56:9c:5d:5b | 20 | MTU = 1500 . . . | 00:50:56:9c:6d:5b |
| P94 (FastEth1/11) | 00:50:56:9c:5d:5c | 20 | MTU = 1500 . . . | 00:50:56:9c:6d:5c |

At step 440, MS 320 communicates with other nodes' BMCs 206 (FIG. 2) over the OOB network, to collect the NIC inventory. In particular, for each node 110, 120, and/or other nodes in network 310, MS 320 obtains the node's MAC addresses and, possibly, port identifiers and/or other information.

At step 444, MS 320 uses a discovery protocol (e.g. LLDP) to identify switches 120 and the entire topology of network 310. MS 320 then requests the switches 120, possibly using SNMP or some other network protocol, possibly over the in-band network, to provide operation parameters for each switch port. The operation parameters may include, for each switch port, the Adjacent MACs, the VLAN IDs, and the Properties (see Table 2). In sending these requests to the switches, MS 320 may use the switches' MAC addresses as destination addresses.

At step 450, for each server port MAC address obtained at step 440, MS 320 identifies the immediately connected switch port ("SW's Adjacent Port") and the Properties configured on the switch port. For example, MS 320 may look up the server port MAC address in the Adjacent MAC column in Table 2, and obtain the corresponding entries in the same row, which include the immediately connected switch port's MAC address (in the "MAC address" column), the VLAN ID, and the Properties ("MTU and other properties" column).

At step 460, MS 320 obtains a solution blueprint for network 310. The blueprints may be stored in any suitable database 340 (FIG. 3A), possibly in a customer support computer 140 outside of network 310, or they can be stored in network 310. A blueprint is a template providing general information about the physical and virtual components in network 310, including the roles. Exemplary roles may be: OOB; in-band management; data traffic; data traffic for a storage unit (e.g. for a server 110) and/or a particular VLAN ID; data center bridging link; uplink; and possibly others. The invention is not limited to any specific roles.

The blueprint does not necessarily associate a role with a specific server port or switch port. The blueprint may associate a role with properties and/or VLANs. For example, the blueprint may associate the data traffic role with the MTU property value of 9162, and the in-band management role with MTU of 1500. In another example, the blueprint may associates the data traffic role with a VLAN ID of 10.

At step 470, for a role specified in the blueprint, the MS 320 reads the blueprint's corresponding parameters such as VLAN IDs or Properties, and MS 320 matches these parameters against the data received from the switches (step 450). If parameters match, MS 320 assigns the role to the corresponding switch port(s), and to the adjacent server ports. For example, if the blueprint associates a role with a VLAN ID, then all the switch ports associated with the same VLAN ID at step 450, and their adjacent server ports, will be assigned the same role.

Many implementations of this process are possible. For example, in some embodiments, instead of looping through the roles, MS 320 may loop through the server ports (obtained at step 444), and for each server port, may determine the Adjacent switch port and the corresponding VLAN ID and/or Properties (as in step 450; steps 450 and 470 may be merged). If the blueprint specifies a role for the VLAN ID, and/or for any of the Properties, MS 320 will assign the role to the server port.

For example, suppose the blueprint associates the data traffic (or corresponding VLAN IDs) with MTU of 9162, and the in-band management traffic (or corresponding VLAN IDs) with MTU of 1500. In configuring the server 110.1 (FIG. 3B), at step 450, MS 320 can determine (see Table 2) that the server port P30 is adjacent to switch port P30 associated with MTU of 1500; and the server ports P40 and P50 are adjacent to respective switch ports P60 and P90 with MTU of 9162. At step 470, since the blueprint provides MTU of 9162 for data traffic (or for corresponding VLAN IDs), MS 320 associates the server ports P40 and P50 with data traffic role. Since the blueprint provides MTU of 1500 for in-band management traffic (or corresponding VLAN IDs), MS 320 associates the server port P30 with in-band management role.

If the roles are inconsistent, e.g. one role is associated with a VLAN ID configured on a switch port, and a different role is associated with an MTU value on the same switch port, the inconsistency may be resolved by assigning multiple roles to the Adjacent server port, and/or assigning the roles based on some priority or other default mechanism, and/or by getting a human administrator's input. Alternatively or in addition, MS 320 may resolve the inconsistency using the history data for the server port or switch port roles. For example, if the server port or the adjacent switch port had the data traffic role in the most recent use, MS 320 may assign the data traffic role to the server port, or may show the history data to the user to help the user determine the role. MS 320 may keep the history in its memory 220 for example, or the history may be kept, for each switch or server, in the switch's or server's memory and provided to MS 320 upon request from the MS. In some embodiments, the administrator may be shown (e.g. on a computer monitor) different roles as possible candidates based on the inconsistent roles and/or history roles, and may be requested to pick the role using a user interface device (keyboard, mouse, touch-screen technology, voice recognition, or other suitable types).

The same techniques can be used if the blueprint specifies the same parameter values (e.g. the same MTU value) for different roles, so the parameters cannot be used to determine a port's role. For example, if all the roles are associated with the MTU value of 9162 and with no other parameters, and if all the switch ports have the MTU value of 9162, the server ports' roles cannot be determined from the process of FIG. 4. In this case, MS 320 may seek a human administrator input and/or use the switch port history as described above for the inconsistent roles.

At step 480, the server port roles are used to configure the server 110, possibly by conventional techniques. For example, in some embodiments, MS 320 writes the server ports' roles in the OS image to be loaded into the server's memory 220. MS 320 then automatically powers down the server 110 (or powers the server subsystem 204) via an OOB command to BMC 206. Then MS 320 powers the server (or subsystem 204) back up to cause BIOS execution. BIOS 230 then loads the OS image containing the updated server port roles into memory 220.

In another embodiment, BIOS 230 is designed to load the OS 234 through an in-band management port. Upon discovering the server ports' roles, MS 320 writes the roles to server memory 220 at a location coordinated with the BIOS. Then MS 320 powers down each server and powers it up again, to cause the server to execute the BIOS 230. BIOS 230 uses the roles written by MS 320 to identify the in-band management port, and loads the OS through this port.

Some embodiments of the present invention are defined by the following clauses:

Clause 1 defines a method for remotely discovering (i.e. discovering over a network), by a management computer system (e.g. 320; the management computer system may include a distributed system of multiple computers interconnected over a network, including computers outside of network 310), one or more roles of one or more network interfaces (a network interface can be a physical port, subport, slot, or some other type) of a first computer system (e.g. a server 110 or some other server or non-server computer) in a first network comprising one or more switches, the method comprising:

obtaining (e.g. as in step 460), by the management computer system, a blueprint specifying one or more roles, at least one role being associated by the blueprint with one or more network parameters (parameters can be a VLAN ID, or MTU value, or a duplex setting (e.g. full or half duplex), or QoS, or whether the Spanning Tree Protocol or some other protocol should be enabled or disabled, or other parameters or combinations of parameters);

obtaining (e.g. as in 430), by the management computer system, switch operation data from one or more switches in the first network, the switch operation data comprising one or more network parameters for one or more network interfaces of one or more of the switches;

determining (e.g. as in 450) by the management computer system, from the switch operation data, at least one switch interface adjacent to at least one interface of the first computer system;

matching, by the management computer system, the network parameters obtained from the switch operation data for said at least one adjacent switch interface, against the network parameters of the blueprint, to determine one or more roles associated with at least one matched parameter by the blueprint, and using the determined one or more roles to determine at least one role for the at least one interface of the first computer system.

2. The method of clause 1 further comprising configuring the first computer system by the management computer system to use said at least one interface of the first computer system according to the determined at least one role. (Configuring may involve updating the server's BIOS or OS image; see step 480 for example.)

3. The method of clause 2 wherein said configuring comprises configuring the first computer system's BIOS.

4. The method of clause 2 or 3 wherein said configuring comprises configuring the first computer system's operating system image.

5. The method of any preceding clause wherein said at least one role is in-band management.

6. The method of any preceding clause wherein said at least one role is data traffic.

7. The method of any preceding clause wherein at least one matched parameter identifies a maximum transfer unit (MTU).

8. The method of any preceding clause wherein at least one matched parameter identifies a VLAN ID.

9. The method of any preceding clause wherein the switch operation data comprise data obtained by the one or more switches performing network discovery.

10. A method for remotely discovering, by a management computer system, one or more roles of one or more network interfaces of a first computer system in a first network comprising one or more switches, the method comprising:

(1) obtaining, by the management computer system, switch operation data from one or more switches in the first network, the switch operation data comprising, for at least one network interface of the switch:

(1)(a) an identification of each adjacent interface, and (1)(b) at least one of:

(1)(b)(i) one or more network interface properties (e.g. MTU, duplex setting, or other);

(1)(b)(ii) one or more VLAN IDs;

(2) obtaining, by the management computer system, a blueprint specifying one or more roles and, for at least one role, at least one of:

(2)(a) one or more network interface properties;

(2)(b) one or more VLAN IDs;

(3) for at least one interface of the first computer system, determining an adjacent interface of a switch using the data (1)(a), and determining the corresponding at least one of (2)(a), (2)(b);

(4) for said at least one interface, searching the blueprint for the determined at least one of (2)(a), (2)(b), to obtain one or more corresponding roles.

11. The method of clause 10, wherein the at least one of (2)(a) and (2)(b) is (2)(a).

12. The method of clause 10, wherein the at least one of (2)(a) and (2)(b) is (2)(b).

The invention includes switches, servers, management computer systems, and other computers for performing the methods described herein, and includes computer readable media with software for causing the computers to perform methods described herein. The invention is defined by the appended claims.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for configuring network interface roles, comprising:
   obtaining, by a management system, a network parameter/network interface role blueprint that includes:
      at least one blueprint network parameter; and
      a corresponding network interface data transmission role that is not associated with a network interface and that identifies a data type that should be transmitted by network interfaces that are configured with network parameters that match the at least one blueprint network parameter;
   obtaining, by the management system from a switch that includes a switch network interface that was previously configured with at least one switch network parameter, the at least one switch network parameter and adjacent computer network interface information;
   determining, by the management system using the adjacent computer network interface information, a computer network interface that was previously configured with at least one computer network interface parameters and that is connected to the switch network interface;
   matching, by the management system, the at least one blueprint network parameter included in the network parameter/network interface role blueprint with each of the at least one switch network parameter and the at least one computer network interface parameter;
   assigning, by the management system based on the matching of the at least one blueprint network parameter included in the network parameter/network interface role blueprint with each of the at least one switch network parameter and the at least one computer network interface parameter, the network interface data transmission role to the switch network interface and the computer network interface such that the switch network interface and the computer network interface may begin transmitting the data type defined by the network interface data transmission role; and
   configuring, by the management system, a Basic Input/Output System (BIOS) included in a computer system that includes the computer network interface to use the computer network interface according to the network interface data transmission role.

2. The method of claim 1, wherein the configuring the BIOS to use the computer network interface according to the network interface data transmission role includes:
   providing, by the management system, the network interface data transmission role in a memory location that is accessible to the BIOS.

3. The method of claim 2, wherein the configuring the BIOS to use the computer network interface according to the network interface data transmission role includes:
   rebooting, subsequent to providing the network interface data transmission role in the memory location that is accessible to the BIOS, the computer system to cause the BIOS to use the computer network interface according to the network interface data transmission role.

4. The method of claim 1, wherein the BIOS using the computer network interface according to the network interface data transmission role includes:
   loading, by the BIOS, an operating system using the computer network interface.

5. The method of claim 1, wherein the at least one switch network parameter and the at least one blueprint network parameter each include a common maximum transfer unit (MTU) network parameter network parameter.

6. The method of claim 5, wherein the network interface data transmission role includes at least one of:
   an out-of-band data transmission role;
   an in-band data transmission role;
   a management data transmission role;
   a non-management data transmission role;
   a storage data transmission role;
   a VLAN data transmission role;
   a data center bridging data transmission role; and
   an uplink data transmission role.

7. The method of claim 1, wherein the switch is configured to obtain the adjacent computer network interface information via performance of network discovery operations.

8. The method of claim 1, wherein the at least one switch network parameter and the at least one blueprint network parameter each include a common Virtual Local Area Network Identifier (VLAN ID) network parameter.

9. The method of claim 8, wherein the network interface data transmission role includes at least one of:
   an out-of-band data transmission role;
   an in-band data transmission role;
   a management data transmission role;
   a non-management data transmission role;
   a storage data transmission role;
   a VLAN data transmission role;
   a data center bridging data transmission role; and
   an uplink data transmission role.

10. A method for discovering network interface roles, comprising:
   obtaining, by a management system from a switch that includes a switch network interface that was previously configured with at least one switch network parameter:
      adjacent computer network interface information that identifies a computer network interface that is connected to the switch network interface and that was previously configured with at least one computer network interface parameter; and
      at least one of:
         a switch network interface operation property; and
         a switch network interface Virtual Local Area Network Identifier VLAN ID;
   obtaining, by the management system, a network parameter/network interface role blueprint that includes a network interface data transmission role that is not associated with a network interface and that identifies a data type that should be transmitted by network interfaces that are configured with network parameters that match at least one of:
      a blueprint network interface operation property that is included in the network parameter/network interface role blueprint and that corresponds to the network interface data transmission role;
      a blueprint VLAN ID that is included in the network parameter/network interface role blueprint and that corresponds to the network interface data transmission role; and
   determining, by the management system using the adjacent computer network interface information, a computer network interface that was previously configured with the at least one computer network interface parameter and that is connected to the switch network interface;

matching, by the management system, at least one of the blueprint network interface operation property and the blueprint VLAN ID with each of 1) the at least one computer network interface parameter, and 2) at least one of the switch network interface operation property and the switch network interface VLAN ID;

assigning, by the management system, the network interface data transmission role identified in the network parameter/network interface role blueprint to each of the switch network interface and the computer network interface based on the at least one blueprint network interface operation property and the blueprint VLAN ID matching with each of 1) the at least one computer network interface parameter, and 2) at least one of the switch network interface operation property and the switch network interface VLAN ID, wherein the assigning the network interface data transmission role to each of the switch network interface and the computer network interface allows the switch network interface and the computer network interface to begin transmitting the data type defined by the network interface data transmission role; and configuring, by the management system, a Basic Input/Output System (BIOS) included in a computer system that includes the computer network interface to use the computer network interface according to the network interface data transmission role.

11. The method of claim 10, wherein the network interface data transmission role includes at least one of:
an out-of-band data transmission role;
an in-band data transmission role;
a management data transmission role;
a non-management data transmission role;
a storage data transmission role;
a VLAN data transmission role;
a data center bridging data transmission role; and
an uplink data transmission role.

12. The method of claim 10, wherein the network interface data transmission role includes at least one of:
an out-of-band data transmission role;
an in-band data transmission role;
a management data transmission role;
a non-management data transmission role;
a storage data transmission role;
a VLAN data transmission role;
a data center bridging data transmission role; and
an uplink data transmission role.

13. A non-transitory, computer readable media comprising instructions for execution by one or more hardware processors of a management system to cause the management system to perform operations comprising:

obtaining a network parameter/network interface role blueprint that includes:
at least one blueprint network parameter; and
a corresponding network interface data transmission role that is not associated with a network interface and that identifies a data type that should be transmitted by network interfaces that are configured with network parameters that match the at least one blueprint network parameter;

obtaining, from a switch that includes a switch network interface that was previously configured with at least one switch network parameter, the at least one switch network parameter and adjacent computer network interface information;

determining, using the adjacent computer network interface information, a computer network interface that was previously configured with at least one computer network interface parameters and that is connected to the switch network interface;

matching the at least one blueprint network parameter included in the network parameter/network interface role blueprint with each of the at least one switch network parameter and the at least one computer network interface parameter;

assigning, based on the matching of the at least one blueprint network parameter included in the network parameter/network interface role blueprint with each of the at least one switch network parameter and the at least one computer network interface parameter, the network interface data transmission role to the switch network interface and the computer network interface such that the switch network interface and the computer network interface may begin transmitting the data type defined by the network interface data transmission role; and configuring a Basic Input/Output System (BIOS) included in a computer system that includes the computer network interface to use the computer network interface according to the network interface data transmission role.

14. The non-transitory, computer readable media of claim 13, wherein the instructions that are configured cause the management system to configure the BIOS to use the computer network interface according to the network interface data transmission role include instructions that are configured to cause the management system to perform operations comprising:
providing the network interface data transmission role in a memory location that is accessible to the BIOS.

15. The non-transitory, computer readable media of claim 14, wherein the instructions that are configured cause the management system to configure the BIOS to use the computer network interface according to the network interface data transmission role include instructions that are configured to cause the management system to perform operations comprising:
rebooting, subsequent to providing the network interface data transmission role in the memory location that is accessible to the BIOS, the computer system to cause the BIOS to use the computer network interface according to the network interface data transmission role.

16. The non-transitory, combination of claim 13, wherein the at least one switch network parameter and the at least one blueprint network parameter each include a common maximum transfer unit (MTU) network parameter network parameter.

17. The non-transitory, computer readable media of claim 16, wherein the network interface data transmission role includes at least one of:
an out-of-band data transmission role;
an in-band data transmission role;
a management data transmission role;
a non-management data transmission role;
a storage data transmission role;
a VLAN data transmission role;
a data center bridging data transmission role; and
an uplink data transmission role.

18. The non-transitory, computer readable media of claim 13, wherein the switch is configured to obtain the adjacent computer network interface information via performance of network discovery operations.

19. The non-transitory, computer readable media of claim 13, wherein the at least one switch network parameter and the at least one blueprint network parameter each include a Virtual Local Area Network Identifier (VLAN ID) network parameter.

20. The non-transitory, computer readable media of claim 19, wherein the network interface data transmission role includes at least one of:
- an out-of-band data transmission role;
- an in-band data transmission role;
- a management data transmission role;
- a non-management data transmission role;
- a storage data transmission role;
- a VLAN data transmission role;
- a data center bridging data transmission role; and
- an uplink data transmission role.

* * * * *